United States Patent
Vaara

[11] Patent Number: 5,884,176
[45] Date of Patent: Mar. 16, 1999

[54] FAST HANDOVER BY PREASSIGNING NEIGHBORING CANDIDATE CELLS

[75] Inventor: Tomi Vaara, Espoo, Finland

[73] Assignee: Nokia Telecommunications Oy, Espoo, Finland

[21] Appl. No.: 750,530

[22] PCT Filed: Jun. 12, 1995

[86] PCT No.: PCT/FI95/00341

§ 371 Date: Dec. 13, 1996

§ 102(e) Date: Dec. 13, 1996

[87] PCT Pub. No.: WO95/35006

PCT Pub. Date: Dec. 21, 1995

[30] Foreign Application Priority Data

Jun. 14, 1994 [FI] Finland ..................... 942817

[51] Int. Cl.⁶ ........................................... H04B 7/22
[52] U.S. Cl. ........................................ 455/438; 455/444
[58] Field of Search ........................ 455/436, 437, 455/438, 439, 440, 441, 442, 443, 444, 449, 525, 10, 63

[56] References Cited

U.S. PATENT DOCUMENTS

| | | | |
|---|---|---|---|
| 5,170,485 | 12/1992 | Levine et al. | 455/440 |
| 5,276,906 | 1/1994 | Felix | 455/438 |
| 5,379,446 | 1/1995 | Murase | 455/444 |
| 5,392,453 | 2/1995 | Gudmundsen et al. | 455/444 |
| 5,432,843 | 7/1995 | Bonta | 455/438 |
| 5,509,051 | 4/1996 | Barnett et al. | 455/443 |
| 5,640,677 | 6/1997 | Larlsson | 455/444 |

FOREIGN PATENT DOCUMENTS

| | | |
|---|---|---|
| 369 535 | 5/1990 | European Pat. Off. |
| 526 436 | 2/1993 | European Pat. Off. |
| 91/19403 | 12/1991 | WIPO |
| 92/02104 | 2/1992 | WIPO |
| 92/09177 | 5/1992 | WIPO |

*Primary Examiner*—Reinhard J. Eisenzopf
*Assistant Examiner*—Lester G. Kincaid
*Attorney, Agent, or Firm*—Pillsbury Madison & Sutro LLP

[57] ABSTRACT

A handover in a mobile communication system in which a mobile station measures the level of the downlink signals of the neighboring cells of a serving cell, and transmits the measurement results to a fixed network which measures the receive level of the mobile station uplink signal at the serving cell. At least some of the cells of the mobile communication system are assigned as chains of two or more cells. The fixed network reacts to a sudden drop in the receive level of the mobile station uplink signal below a predetermined threshold level at the serving cell by carrying out a handover to a chained cell on the basis of one or more of the latest signal level measurements.

8 Claims, 3 Drawing Sheets

FAST HANDOVER BY PREASSIGNING NEIGHBORING CANDIDATE CELLS

This application is the national phase of international application PCT/FI95/00341 filed Jun. 12, 1995 which designated the U.S.

FIELD OF THE INVENTION

The present invention relates to a mobile communication system in which a mobile station measures the received level, advantageously quality as well, of a downlink signal of a respective currently serving cell and levels of the downlink signals of the respective currently neighboring cells, and transmits the measurement results to a fixed network which measures the received level of the mobile station uplink signal at the serving cell, and determines the need for a handover by utilizing the measured signal levels processed, e.g. averaged, so as to ensure the stability of the network, and selects a particular neighboring cell as a target cell for the handover.

BACKGROUND OF THE INVENTION

It is characteristic of a modern mobile communication system that a mobile station is free to roam and connect from one cell to another within the mobile communication system. If a mobile station does not have an ongoing call, the cell crossover only results in registering to a new cell. If a mobile station MS is handling a call during the cell crossover, the call must also be switched to the new cell by a way which causes as little disturbance to the call as possible. The cell crossover process during an ongoing call is called a handover. A handover may also be carried out within a cell from one traffic channel to another. In order for the mobile communication system to be able to detect a need for a handover and to select a suitable target cell for the handover, various kinds of measurements are required in order to determine the connection quality and field strength levels of the neighboring cells. A handover from the serving cell to a neighboring cell can occur, for example, (1), as measurement results of the mobile station/base station indicate a low signal level and/or quality in the present serving cell, and a better signal level can be obtained in a neighboring cell, or (2), as a neighboring cell enables communication at lower transmitting power levels. The latter may occur in cases in which a mobile station is in a border area between cells.

In order to ensure stability of the mobile communication network, the measurement results and the parameters used in the handover are averaged over a period of time. As a result, the handover is made less sensitive to measurement results distorted by instantaneous interference or fadings.

A problem occurring in this kind of a mobile communication network relates to mobile stations which move at high speed in relation to cell size. When a mobile station moves at high speed in the cell and goes behind an obstacle that shadows the signal from the serving cell, the field strength of the serving cell received by the mobile station suddenly drops, but the mobile communication network is not able to react fast enough so that the call might be maintained. Thus, the call may break. Some mobile communication systems employ a so-called call re-establishment procedure which keeps the call connected in the fixed network for a certain period of time even though the connection to the mobile station breaks. If the mobile station can re-establish a connection to the fixed radio network during this time through a cell, the call can quickly be continued. This is not, however, a good solution because there must first be a break in the radio connection and, consequently, the call, before a new connection can be established. This problem which relates to fast-moving mobile stations and slow handovers is especially well-marked in microcell networks.

SUMMARY OF THE INVENTION

The object of this invention is to provide a stable mobile communication system which can, however, deal with sudden changes in field strength during a call.

This is achieved by a mobile communication system of the type illustrated in the foregoing BACKGROUND section, which system is according to the invention characterized in that cells of the mobile communication system are assigned as chains of two or more cells, and that the fixed network, as a response to the sudden drop of the received level of the mobile station uplink signal below a predetermined threshold level at the serving cell, carries out a fast handover to a chained cell of the serving cell.

The invention also relates to a handover method which is according to the invention characterized by assigning cells of a mobile communication system as chains of two or more cells, measuring the level of the mobile station uplink signal at the serving cell, measuring the received level of the downlink signal of the neighboring cell of the serving cell at the mobile station, carrying out a fast handover to a chained cell of the serving cell as a response to a sudden drop of the received level of the mobile station uplink signal below a predetermined threshold level at the serving cell.

The basic idea of the invention is to assign to the respective cells in advance a neighboring cell or cells to which a handover will be performed as a result of a sudden drop in field strength. This procedure is from hereafter referred to as chaining of cells, and neighboring cells that are determined this way are referred to as chained neighboring cells of a cell. The fixed network monitors the level, i.e. field strength, of the uplink signal which the mobile station transmits to the base station of the serving cell. As the field strength received at the base station suddenly drops below a predetermined threshold level, the fixed network carries out a handover to a chained cell of the serving cell. In order for the handover decision to be fast enough, the decision is made on the basis of a momentary field strength of the uplink signal, in other words, on the basis of the latest or a few of the latest measurement results. If the serving cell has several chained cells, a handover in the preferred embodiment of the invention is carried out to the chained cell which, according to a few of the latest measurements carried out by the mobile station, has the highest field strength. In an embodiment of the invention, in which embodiment a mobile communication system comprises of microcells as well as macrocells overlaying the microcells, the call is handed-over from the serving microcell to a macrocell, if the handover to a chained microcell fails or is not possible due to, for example, too low a field strength of the chained cell downlink signal.

In other cases, the mobile communication system employs the normal, stable but slower handover strategy which is based on average values of measurements. This normal handover strategy does not detect a sudden drop in a field strength, because the low field strength shows in the average value the measurement results only after it has continued during a sufficient number of individual measurements. The solution of the invention uses along with the normal handover strategy a fast handover procedure which is based on a instantaneous, not the average, field strength of the uplink signal, and submits a mobile communication network which works stably in normal conditions, but can also react fast but in a controlled manner to a sudden drop in the field strength of predetermined cells which are known to contain difficult natural obstacles or buildings.

BRIEF DESCRIPTION OF THE DRAWINGS

In the following, the invention will be described in closer detail by means of illustrating embodiments with reference to the accompanying drawings in, which.

PREFERRED EMBODIMENTS OF THE INVENTION

The present invention can be applied to any cellular or trunked mobile communication system, such as the Pan-European mobile communication system GSM, DCS1800 (Digital Communication System), PCN (Personal Communication Network), UMC (Universal Mobile Communication), UMTS (Universal Mobile Telecommunication System), FPLMTS (Future Public Land Mobile Telecommunication System), etc.

Figure 1:
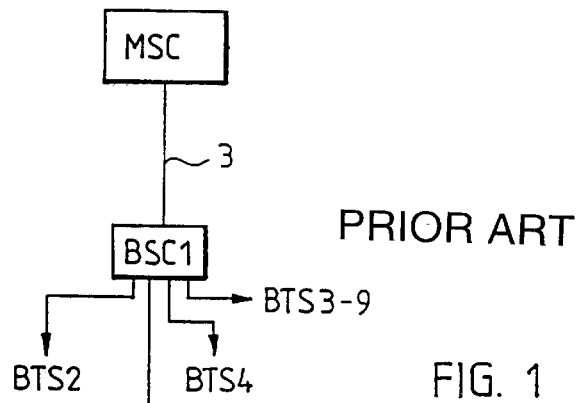
FIG. 1 illustrates a part of a mobile communication system to which the invention can be applied.

FIG. 1 illustrates, as an example, a mobile communication system of the GSM type. The GSM (Global System for Mobile Communications) is a Pan-European mobile communication system which is becoming the universal standard. FIG. 1 very briefly illustrates the basic elements of the GSM system without going any further into the system. For a closer description of the GSM system, the GSM recommendations and "The GSM System for Mobile Communications", M. Mouly & M. Pautet, Palaiseau, France, 1992, ISBN:2-9507190-0-7 are referred to.

The GSM system is a cellular radio system. A mobile services switching center MSC handles the connecting of incoming and outgoing calls. It carries out functions similar to those of an exchange of a public switched telephone network (PSTN). In addition to these, it also carries out functions characteristic of mobile communications only, such as subscriber location management in co-operation with the subscriber registers of the network. As subscriber registers, the GSM system at least includes a home location register HLR and a visitor location register VLR, which are not shown in FIG. 1. More accurate information of the location of the subscriber, usually the accuracy of the location area, is stored in the visitor location register, there being typically one VLR for each mobile services switching center MSC, while the HLR knows which VLR area the mobile station MS is visiting. The mobile stations MS are connected to the center MSC by base station systems. The base station system consists of a base station controller BSC and base stations BTS, i.e. fixed transceivers the mobile stations MS use to communicate with the fixed network over a radio link. One base station controller is used to control several base stations BTS. The tasks of the BSC include, among other things, handovers in cases in which the handover is carried out within the base station, or between two base stations controlled by the same BSC. FIG. 1 only shows, for reasons of clarity, a base station system in which nine base stations BTS1-BTS9 are connected to a base station controller BSC, the radio coverage area of which base stations forms the corresponding radio cells C1–C9.

Figure 2:
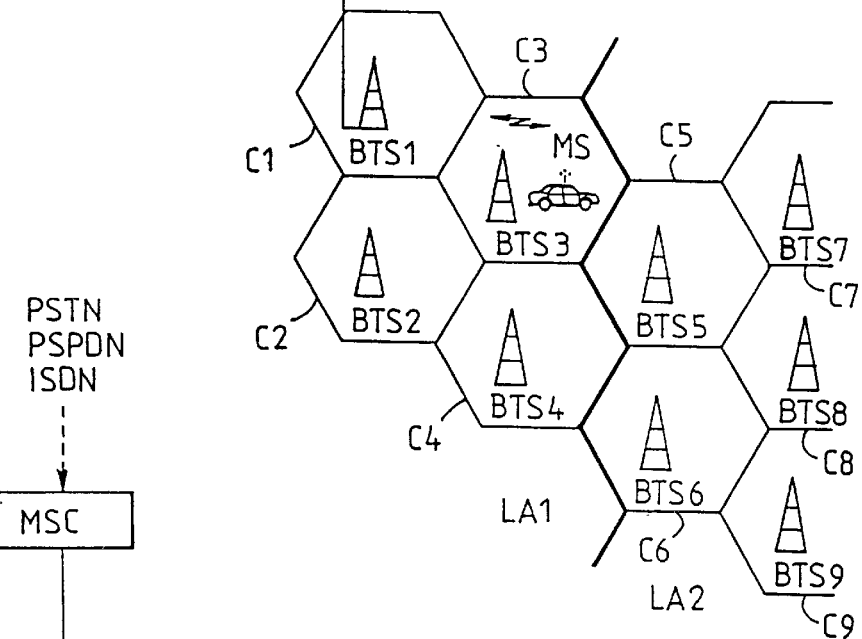
FIG. 2 illustrates a mobile communication system which has a hierarchically and geographically overlaying microcell network and macrocell network.
Figure 2:
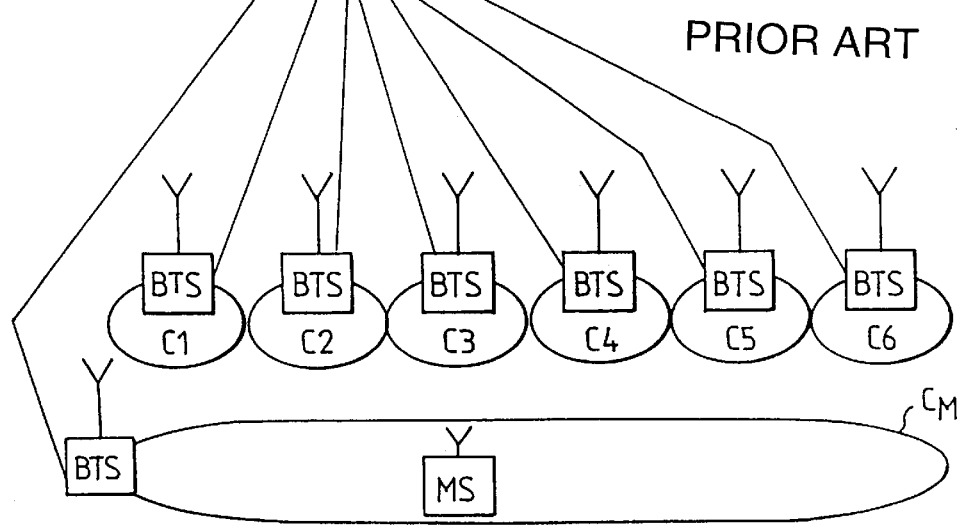

In modern mobile communication systems, both low power hand-held mobile stations and vehicle-mounted mobile stations that have a higher output power are used side by side. For this reason, two types of cells, large macrocells and smaller microcells, which geographically at least partly overlay each other have been employed in some mobile communication systems. FIG. 2 illustrates a mobile communication system with a hierarchically and geographically overlaying microcell and macrocell network. Microcells C1–C6 belong to a microcell network primarily used by mobile stations MS that have a relatively low transmitting power and that are relatively immobile, such as hand-held mobile stations. The macrocell $C_M$ of the macrocell network geographically at least partly overlays the microcells C1–C6 of the microcell network. The macrocell is primarily used by mobile stations that have a high transmitting power and that move relatively fast, such as vehicle-mounted radio stations. The mobile stations MS move between microcells, between macrocells, and from a macrocell to a microcell and vice versa according to system-specific crossover and handover procedures. As the microcells are usually very small, fast moving mobile stations and the consequent sudden changes in field strength are especially common in these networks.

Decisions on handovers during on-going calls are made by a base station controller BSC on the basis of various handover parameters assigned to each cell, and on the basis of measurement results reported by a mobile station MS and base stations BTS. A handover is normally carried out on the basis of criteria of the radio path, but it can be performed due to other reasons as well, for example, for load sharing.

In accordance with the GSM technical recommendations, for example, a mobile station MS monitors (measures) the level and quality of the downlink signal of the serving cell, and the level of the downlink signal of the neighboring cells of the serving cell. The base station BTS monitors (measures) the level and quality of the uplink signal received from each mobile station MS served by the base station BTS. All the measurement results are transmitted to the base station controller. Alternatively, all decisions on a handover can be made at a mobile services switching center MSC to which all the measurement results are in such a case transmitted. An MSC also controls at least those handovers occurring from the area of one base station controller to the area of another.

If a mobile station MS roams in a radio network, a handover from the traffic channel of the serving cell to the traffic channel of the neighboring cell is normally performed either (1) as the averaged measurement results of the mobile station MS and/or the base station BTS indicate a low signal level and/or quality from the current serving cell and a better signal level can be obtained from a neighboring cell, and/or (2) as a neighboring cell enables communication at lower transmitting power levels, in other words, as the mobile station MS is in a border area between cells. In radio networks, the aim is to avoid unnecessarily high power levels and thus interference elsewhere in the network.

The base station controller BSC selects according to the system handover algorithm and on the basis of the reported measurement results, one cell from among the neighboring cells as the target cell for the handover. The selection may be simplest implemented by selecting a neighboring cell which has the best radio path qualities, i.e. the highest signal level.

It should be noted that, as far as the present invention is concerned, the exact implementation of a normal handover in the network is not important. The fast handover of the invention can be implemented along with the normal handover strategy of the mobile communication network.

As noted earlier, in order to ensure stability of a mobile communication network, the measurement results and parameters used in the handover are averaged over a certain period of time. This is done in order to make the handover less sensitive to measurement results distorted by instantaneous disturbances or fadings. A stable handover procedure such as this does not, however, have the time to react to sudden drops in field strength which result from a fast moving mobile station suddenly going behind an obstacle.

Figure 3:
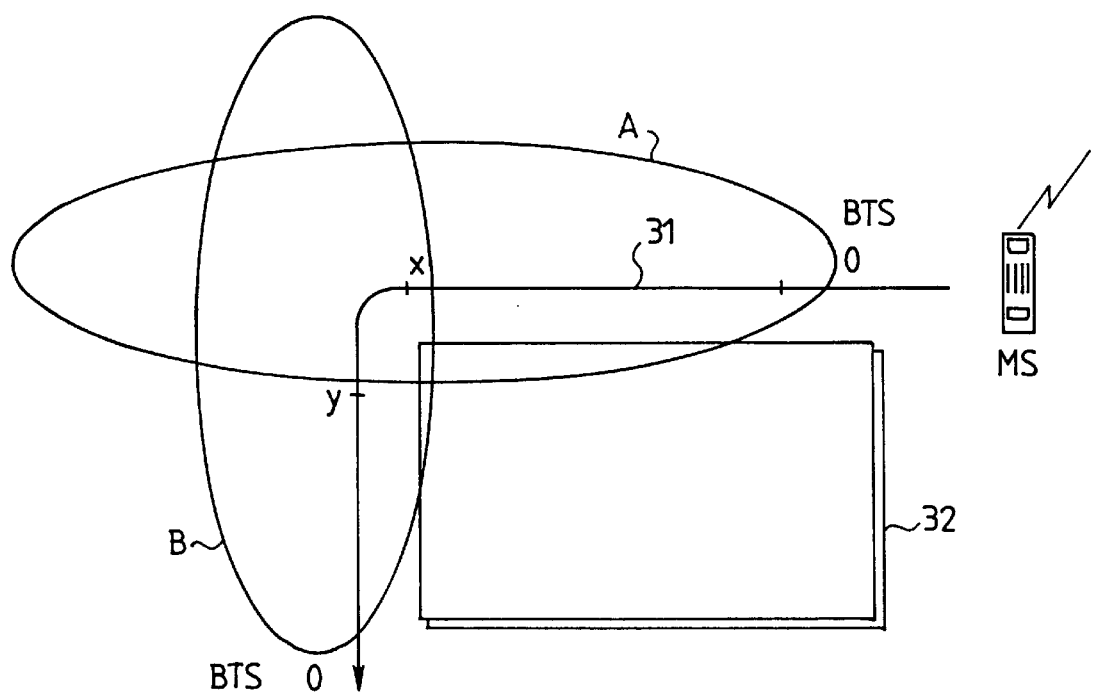
FIG. 3 illustrates chaining of cells in accordance with the invention.

The situation can be illustrated by FIG. 3. Two cells, A and B, have been arranged to cover the two sides of a rectangular natural obstacle or building so that the cells partly overlap at a corner of the obstacle. Let us assume that a mobile station MS roams at high speed along path 31 in the cell A to the location x, turns at the corner behind the obstacle 32 so that the field strength of the cell A downlink signal suddenly drops at the location y. The field strength of the cell B downlink signal which the mobile station MS measures increases equally suddenly when the mobile station emerges from behind the obstacle 32 to the location x. The change in field strengths as the mobile station MS turns at the corner of obstacle 32 is very sudden, even within one measurement interval, in which case an averaging handover strategy does not even detect any need for a handover.

Along with the normal handover algorithm in such locations within the network in which sudden changes in field strength occur due to permanent obstacles or other similar reasons, a fast handover according to the invention can be employed. This means that each problematic cell is beforehand assigned a chained cell or cells from among its neighboring cells to which a handover is performed as a result of a sudden drop in field strength. A network element controlling the handover, such as a base station controller BSC, stores information as to which cells employ a fast handover, information as to the chained cells of these cells, and cell-specific threshold levels $L_{RD}$ for the uplink signals, so that the uplink signal level falling below the threshold level initiates a fast handover according to the invention. Alternatively, the threshold level $L_{RD}$ may be set to be equal for each cell.

Figure 4:
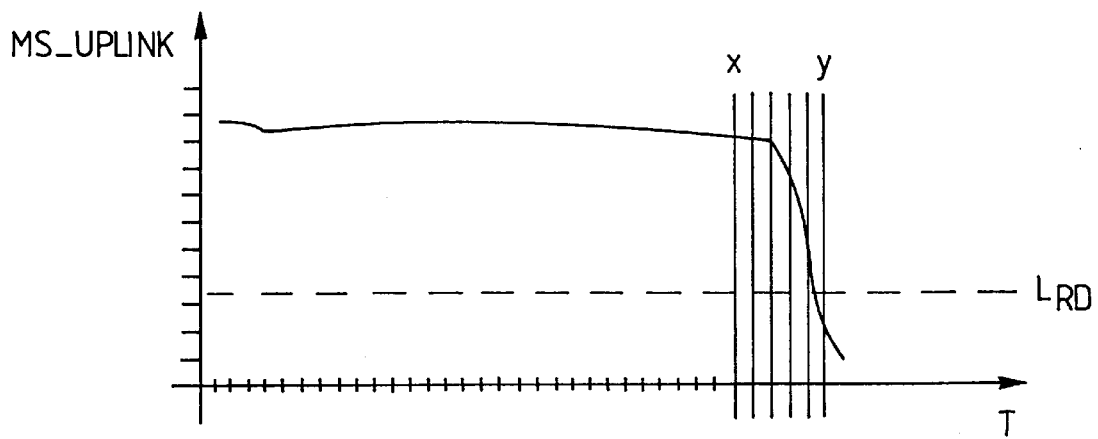
FIG. 4 is a chart which shows the receive level of a mobile station uplink signal at the serving cell as a function of time.
Figure 5:
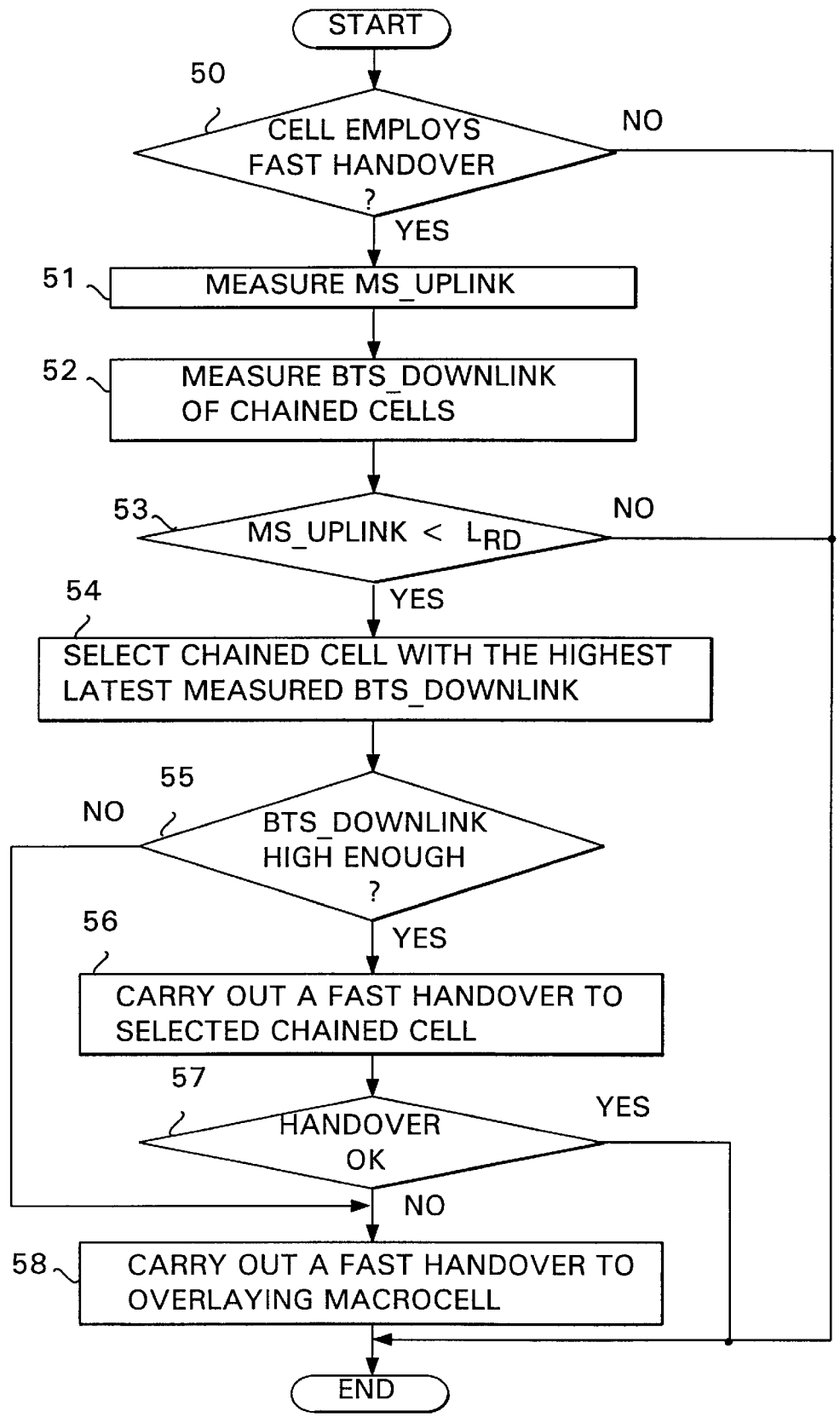
FIG. 5 is a block diagram illustration of a fast handover according to the invention.

In the following, the invention will be described by means of the preferred embodiment with reference to FIGS. 3, 4 and 5. It is assumed that the handover of the invention is carried out under the control of base station controller BSC. In FIG. 3, cell A serves a mobile station MS. Cell B has been determined to be a neighboring cell, and a chained cell, for cell A. Apart from the normal functions, the base station controller BSC of the cells A and B also carries out the procedure according to the flow chart of FIG. 5. At first, the base station controller BSC checks from the cell A data whether the cell employs a fast handover (block 50). If it does not, the BSC continues normal operation. If it does, the BSC has the field strength (receive level) MS_UPLINK of the uplink signal of the mobile station MS measured, which MS_UPLINK is received at the base station BTS of cell A (block 51). In addition, the BSC has the field strength (receive level) BTS_DOWNLINK of the downlink signal of the chained cell B measured, which BTS_DOWNLINK is received at the mobile station MS (block 52). These measurement results are obtained in connection with the measurements made for a normal handover. Now, in addition to average values, the BSC obtains and utilizes discrete measurement results as well. The base station controller BSC regularly checks whether the measured field strength MS_UPLINK is lower than or equal to the threshold level $L_{RD}$ for a fast handover determined for the serving cell A (block 53). If MS_UPLINK is higher, normal operation is resumed until the next check time. The graph of FIG. 4 represents the measured field. strength MS_UPLINK as the mobile station MS moves at high speed along path 31. As the mobile station MS moves at high speed to the location x in the cell A, the measured MS_UPLINK stays high. As the mobile station MS turns around the corner of the obstacle 32 and moves from the location x towards the location y, the measured MS_UPLINK suddenly drops due to the shadowing caused by the obstacle 32. MS_UPLINK measured at the location y is lower than the threshold level $L_{RD}$ and thus the process of FIG. 5 proceeds from the block 53 to the block 54. If the serving cell has several chained cells, a chained cell with the highest latest measured BTS_DOWNLINK value/values is chosen in the block 54. In FIG. 3, the serving cell only has one chained cell B which, then, is selected as the target cell for a fast handover. The other neighboring cells of the serving cell, which have not been assigned as chained cells, cannot be selected as the target cell for a fast handover. If preferred, it can additionally be checked in the block 53 whether the latest measured signal level/levels of the selected chained cell is/are high enough. In a hierarchical mobile communication network, in which cells A and B are microcells, it may be desired to check whether the fast handover is successful, as in block 57. If the handover is successful, the BSC goes to normal operation. If the handover to a chained cell fails, or the latest measured BTS_DOWNLINK value or values is/are not high enough, a fast handover may be carried out in a hierarchical network from the microcell A to an overlaying macrocell as in block 58. It should be noted that the functions of the blocks 55, 57 and 58 are not essential to the present invention and may well be omitted.

The drawings and their description are only intended to illustrate the present invention. The invention may vary in details within the scope and spirit of the attached claims.

I claim:

1. A mobile communication system, comprising:

a plurality of mobile stations;

a fixed network having a plurality of cells arranged such that each cell from among said plurality of cells has at least one other cell from among said plurality of cells as a neighboring cell;

each of said mobile stations, while operating, being served by a respective cell from among said cells, as a currently serving cell;

at least one of said cells having at least one normal handover chained cell which is a predetermined fixed handover cell for a normal handover for said at least one cell;

each said mobile station being arranged to measure the downlink signal level of the respective currently serving one of said cells, and the downlink signal level of each neighboring cell of the said respective currently serving cell to thereby obtain measurement results, and further to report said measurement results to the fixed network;

said fixed network being arranged to measure the uplink signal level of each said mobile station in the respective said currently serving call to thereby obtain measurement results;

said fixed network being further arranged to average said downlink and uplink signal level measurements results, to determine a need for a normal handover, and to select a target cell for said normal handover based on said averaged downlink and uplink signal level measurement results;

a least one of said cells from among said plurality of cells further having a fast handover chained cell which is a predetermined fixed handover target cell for said at least one cell for a fast handover;

said fixed network, in connection with obtaining said measurement results, being arranged to determine a need for a fast handover as a response to a drop of a measured instantaneous unaveraged uplink signal level of a respective said mobile station below a predetermined threshold level in the respective said one cell currently serving the said respective mobile station, and to carry out said fast handover to said fast handover chained cell.

2. A mobile communication system as claimed in claim 1, wherein:

at least some of said cells from among said plurality of cells are microcells, and at least others of said cells from among said cells are macrocells which at least partly overlie respective ones of said microcells;

each said normal handover cell is a microcell from among said microcells and each said fast handover cell is a macrocell from among said macrocells; and said fixed network is further arranged to carry out said normal handover and to carry out said fast handover, from a respective said microcell acting as a respective currently serving cell, to a respective at least partly overlying macrocell, if an attempt to perform a respective said handover to a respective said normal handover or fast handover chained cell which is a microcell fails.

3. A mobile communication system, comprising:

a plurality of mobile stations;

a fixed network having a plurality of cells arranged such that each cell from among said plurality of cells has at least one other cell from among said plurality of cells as a neighboring cell;

each of said mobile stations, while operating, being served by a respective cell from among said cells, as a currently serving cell;

at least one of said cells having at least one normal handover chained cell which is a predetermined fixed handover cell for a normal handover for said at least one cell;

each said mobile station being arranged to measure the downlink signal level of the respective currently serving one of said cells, and the downlink signal level of each neighboring cell of the said respective currently serving cell to thereby obtain measurement results, and further to report said measurement results to the fixed network;

said fixed network being arranged to measure the uplink signal level of each said mobile station in the respective said currently serving call to thereby obtain measurement results;

said fixed network being further arranged to average said downlink and uplink signal level measurements results, to determine a need for a normal handover, and to select a target cell for said normal handover based on said averaged downlink and uplink signal level measurement results;

a least one of said cells from among said plurality of cells having at least two fast handover chained cells which are predetermined fixed handover target cells for said at least one cell for a fast handover;

said fixed network, in connection with obtaining said measurement results, being arranged to determine a need for a fast handover as a response to a drop of a measured instantaneous unaveraged uplink signal level of a respective said mobile station below a predetermined threshold level in the respective at least one cell currently serving the said respective mobile station; and said fixed network being arranged to, responsive to determining said need for said fast handover, immediately to carry out said fast handover to a one of said at least two fast handover chained cells which, on the basis of at least one instantaneous said downlink signal level measured prior to said fast handover, has a highest downlink signal level.

4. A mobile communication system as claimed in claim 3, wherein:

at least some of said cells from among said plurality of cells are microcells, and at least others of said cells from among said cells are macrocells which at least partly overlie respective ones of said microcells;

each said normal handover cell is a microcell from among said microcells and each said fast handover cell is a microcell from among said macrocells; and said fixed network is further arranged to carry out said normal handover and to carry out said fast handover, from a respective said microcell acting as a respective currently serving cell, to a respective at least partly overlying macrocell, if an attempt to perform a respective said handover to a respective said normal handover or fast handover chained cell which is a microcell fails.

5. A handover method in a mobile communication system in which there are a plurality of mobile stations, each, while operating, being served by a respective cell from among a plurality of cells of a fixed network, as a currently serving cell, the cells being arranged such that each cell from among said plurality of cells has at least one other cell from among said plurality of cells as a neighboring cell, said method comprising the steps of:

one of said mobile stations measuring the downlink signal level of the respective currently serving cell, and the downlink signal levels of each neighboring cell of said currently serving cell to thereby obtain downlink signal level measurement results;

said one of said mobile stations reporting said measurement results to said fixed network;

said fixed network measuring the uplink signal level of said one of said mobile stations while said one of said mobile stations is served by the respective said currently serving cell, to obtain uplink signal level measurement results;

said fixed network averaging said downlink and uplink signal level measurement results, determining a need for a normal handover based on said averaging, and selecting a target cell for said normal handover based on said averaging;

providing at least one cell from among said plurality of cells with a fast handover chained cell which is a predetermined fixed handover target cell for the respective said cell for a fast handover;

said fixed network determining a need for a fast handover as a response to a drop of the measured instantaneous unaveraged uplink signal level of the respective said mobile station below a predetermined threshold level, from said measuring of said uplink signal, this drop being characteristic of that occurring due to disappearance of the respective said mobile station behind a building or other obstacle; and said fixed network initiating a fast handover of the respective said mobile station from the respective said currently serving cell to the respective said fast handover chained cell in consequence of said determining of said need for a fast handover.

6. A handover method as in claim 5, in which at least some of said cells from among said plurality of cells are microcells, and at least others of said cells from among said cells are macrocells which at least partly overlie respective ones of said microcells, each said fast handover cell is a microcell from among said macrocells, further including:

said fixed network carrying out a fast handover, from a respective said microcell acting as a respective currently serving cell, to a respective at least partly overlying macrocell, if said initiating of a respective said handover to a respective said normal handover or fast handover chained cell which is a microcell fails to result in a fast handover.

7. A handover method in a mobile communication system in which there are a plurality of mobile stations, each, while operating, being served by a respective cell from among a plurality of cells of a fixed network, as a currently serving cell, the cells being arranged such that each cell from among said plurality of cells has at least one other cell from among said plurality of cells as a neighboring cell, said method comprising the steps of:

one of said mobile stations measuring the downlink signal level of the respective currently serving cell, and the downlink signal levels of each neighboring cell of said currently serving cell to thereby obtain downlink signal level measurement results;

said one of said mobile stations reporting said measurement results to said fixed network;

said fixed network measuring the uplink signal level of said one of said mobile stations while said one of said mobile stations is served by the respective said currently serving cell, to obtain uplink signal level measurement results;

said fixed network averaging said downlink and uplink signal level measurement results, determining a need for a normal handover based on said averaging, and selecting a target cell for said normal handover based on said averaging;

providing at least one cell from among said plurality of cells with at least two fast handover chained cells which are predetermined fixed handover target cells for the respective said cell for a fast handover;

said fixed network determining a need for a fast handover as a response to a drop of the measured instantaneous unaveraged uplink signal level of the respective said mobile station below a predetermined threshold level, from said measuring of said uplink signal, this drop being characteristic of that occurring due to disappearance of the respective said mobile station behind a building or other obstacle; and said fixed network initiating a fast handover of the respective said mobile station from the respective said currently serving cell to a one of said at least two fast handover chained cells which, on the basis of said measuring of at least one instantaneous said downlink signal level measured prior to initiating said fast handover, has a highest downlink signal level.

8. A handover method as in claim 7, in which at least some of said cells from among said plurality of cells are microcells, and at least others of said cells from among said cells are macrocells which at least partly overlie respective ones of said microcells, each said fast handover cell is a microcell from among said macrocells, further including:

said fixed network carrying out a fast handover, from a respective said microcell acting as a respective currently serving cell, to a respective at least partly overlying macrocell, if said initiating of a respective said handover to a respective said normal handover or fast handover chained cell which is a microcell fails to result in a fast handover.

\* \* \* \* \*